United States Patent [19]

Perez

[11] 4,076,037
[45] Feb. 28, 1978

[54] SAFETY VALVE CAP FOR INFLATABLE BODIES

[76] Inventor: Jose R. Perez, 10828 SW. 3 St., Miami, Fla. 33174

[21] Appl. No.: 662,211

[22] Filed: Feb. 27, 1976

[51] Int. Cl.² .............................................. F16K 15/20
[52] U.S. Cl. ..................................... 137/230; 137/508
[58] Field of Search ................ 137/230, 508, 224, 226

[56] References Cited

U.S. PATENT DOCUMENTS

| | | | |
|---|---|---|---|
| 1,229,860 | 6/1917 | Ashelman et al. | 137/230 X |
| 1,481,551 | 1/1924 | Hammond | 137/230 X |
| 1,869,051 | 7/1932 | Davis | 137/224 X |
| 2,505,949 | 5/1950 | DeVilbies | 137/230 |
| 2,737,223 | 3/1956 | Plath | 137/230 X |
| 2,845,088 | 7/1958 | Crausman | 137/508 |
| 3,064,687 | 11/1962 | Natho | 137/500 X |

*Primary Examiner*—Harold W. Weakley

[57] ABSTRACT

A safety valve cap providing an elongated inner chamber with an internally screw-threaded open lower end for threaded engagement on the extended end of a conventional valve stem associated with a vehicle tire, for example. A check valve is movably positioned in the inner chamber between a compression spring and a depressor plate. When the safety valve cap is threaded onto the valve stem, the depressor plate actuates the valve stem check valve releasing compressed air into a first portion of the inner chamber until the air pressure therein is balanced with the tire pressure. A subsequent increase in the tire pressure will move the body portion of the movable check valve outwardly against the forces of the compression spring, actuating said check valve and releasing the excess pressure through a second chamber portion and an orifice in the end wall of the cap to the atmosphere until the air pressure in the tire is slightly overbalanced by the forces of the compression spring, whereupon the body portion of the check valve will move inwardly stopping the flow of compressed air.

4 Claims, 3 Drawing Figures

SAFETY VALVE CAP FOR INFLATABLE BODIES

BACKGROUND OF THE PRESENT INVENTION

The present invention pertains to a safety valve cap for screw-threaded engagement on the end of a valve stem of inflatable bodies such as the tires used on automobiles, trucks, tractors, etc. It is a well known fact that the air pressure in vehicle tires is changeable due to climate conditions, road friction, loading of the vehicle, etc. Particularly in hot weather, after a prolonged period of usage, the increase in air pressure in tires may become quite substantial and under a heavy load sometimes explode or blow out causing accidents which may lead to substantial damage losses as well as to injury or death. The safety valve cap of the present invention provides a very simple, small, inexpensive means to release the excess pressure build up in vehicle tires and to maintain the proper inflation pressure after the release of said excess pressure.

OBJECTS AND ADVANTAGES OF THE PRESENT INVENTION

One of the principal objects of the present invention is to provide a safety valve cap for screw-threaded engagement on the outer end portion of the valve stem of an inflatable body which automatically releases any excess build up of air pressure in the inflatable body and then closes to maintain the required amount of pressure therein after the release.

Another principal object of this invention is to provide a safety valve cap incorporating a check valve, slidably engaged in an interior chamber of the cap which cooperates with a depressor means to release the excess pressure.

A further object of the instant invention is to provide a compression spring in the cap, between the check valve and the outer end closure thereof, said spring being calibrated to maintain the desired degree of air pressure in the inflatable body.

Yet another object of the present invention is to provide a safety valve cap which is very simple in structure and is inexpensive to manufacture.

DETAILED DESCRIPTION OF THE DRAWINGS

Figure 1:
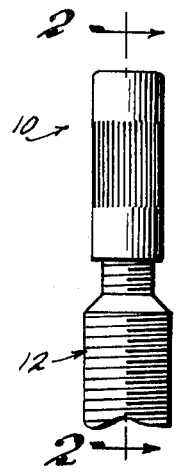
FIG. 1 is a fragmentary side elevational view of a valve stem with a safety valve cap of the present invention installed thereof.
Figure 3:
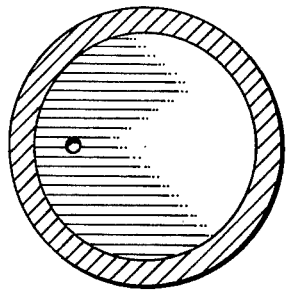
FIG. 3 is a cross sectional view taken along line 3—3 of FIG. 2.

With reference to the drawings in which like reference characters designate like or corresponding parts throughout the several views, the safety valve cap of the present invention is indicated generally at 10, screw-threaded onto the outer end portion of a conventional valve stem 12 of the type generally provided for inflating the tires on automobiles, trucks, tractors, etc.

Figure 2:
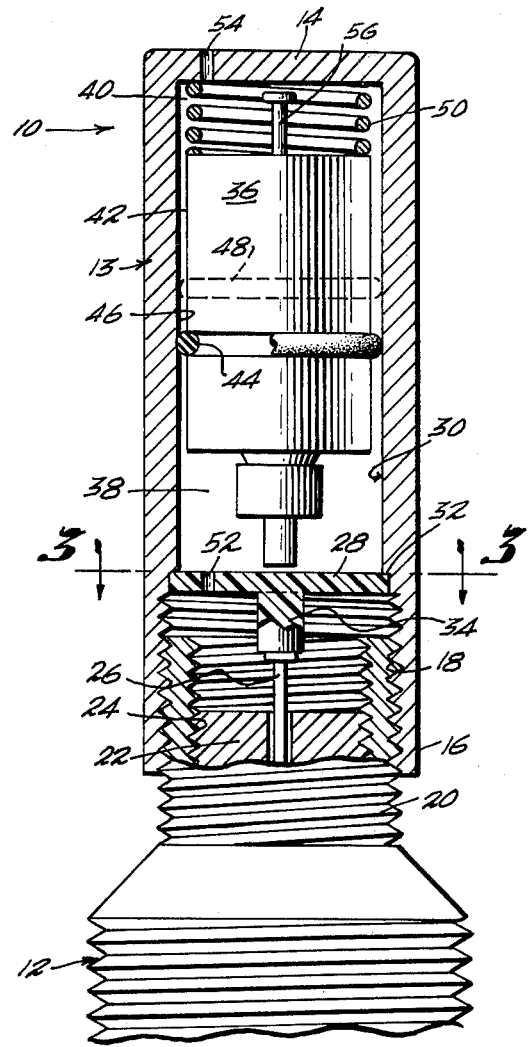
FIG. 2 is an enlarged sectional view taken along line 2—2 of FIG. 1.

With particular reference to FIG. 2, the safety valve cap 10 comprises a generally tubular wall 13 with an outer end closure wall 14. The inner end 16 of cap 10 is open and is internally screw-threaded at 18 for engagement on the outer screw-threaded portion 20 of valve stem 12. As is conventional, the valve stem 12 is provided with a check valve 22, screw-threadably engaged therein as at 24, with an outwardly extending actuating pin 26.

A disc member 28 is provided in the chamber 30, defined by tubular wall 13, adjacent the inner end of screw threads 18. Disc 28 is seated against an inner shoulder 32 of tubular wall 13 and includes an axially, outwardly extending depressor stud 34, normally in a depressing engagement with the valve actuating pin 26 of stem check valve 22 when the cap 10 is engaged on the valve stem as illustrated in FIG. 2. Within the cap chamber 30, a check valve 36 is slidably disposed between the disc member 28 and the end housing closure wall 14, defining an inner chamber portion 38 and an outer chamber portion 40.

With further reference to FIG. 2, the annular housing of check valve 36 functions as a piston 42 within chamber 30 and carriers an O-ring 44 in sealing engagement with the inner annular wall surface 46 of said chamber 30. For stabilizing purposes a second O-ring 48, illustrated in broken lines, may be provided. A compression spring 50 in outer chamber portion 40 is disposed between the piston 42 and the outer end closure wall 14.

At least one orifice 52 is provided through disc member 28 and a similar orifice 54 is provided through end closure wall 14. However, a plurality of small orifices may be provided respectively in the disc 28 and end wall 14.

In operation, the safety valve cap 10 is screw-threaded onto the valve stem, the valve stem check valve pin 26 is depressed by stud 34, releasing the air pressure from the inflatable body into the inner chamber portion 38 causing a balanced air pressure condition in the inflatable body and inner chamber portion 38. This balanced condition is normally maintained by the compression spring 50 which is calibrated to the degree of air pressure to be maintained in the inflatable body.

When the air pressure in the inflatable body rises above the desired level, it passes through orifice 52 into inner chamber portion 38, moving the piston 42 of check valve 36 outwardly, compressing spring 50, depressing the outwardly extending actuating pin 56 of check valve 36 against outer end wall 14, thereby releasing the excess pressure to the atmosphere through orifice 54. After the pressure in the inflatable body returns to the desired level, the compression spring 50 returns the check valve piston 42 to its normal position, closing check valve 36 and stopping the flow of compressed air therethrough.

What is claimed is:

1. A safety valve cap for engagement on the valve stem of an inflatable body to prevent increases of pressure therein above a pre-selected level, the valve stem of said inflatable body being of the type provided with a check valve for pressurizing the inflatable body and for releasing the air pressure therefrom by means of a pressure release pin, said safety valve cap comprising:

A. a generally tubular wall having a first end and a second end and defining an interior chamber, an outer end closure wall having orifice means therethrough at said second end, and an open inner first end, said first end of said tubular wall having an internally threaded zone for removable threaded fixed engagement with an outwardly extending threaded end portion of the valve stem of the inflatable body;

B. a disc member, spanning said interior chamber, adjacent to and spaced from said first end, said disc member having an orifice therethrough and an outwardly extending depressor stud extending toward said second end, said second stud being normally in depressing engagement with the pressure release pin of the valve stem check valve when said tubular wall is in threaded engagement with said valve stem;

C. a check valve, slidably engaged in said interior chamber between the disc member and the first end closure wall, the outer cylindrical housing of said check valve comprising a piston;

D. O-ring means carried by said piston in sealing slidable engagement with the tubular wall in said interior chamber;

E. compression spring means captivated in said interior chamber between said second end closure wall and said piston;

F. said check valve including a release pin in said piston and said pin having a portion extending from said piston toward but not to said outer end closure wall of said second end and adapted upon axial movement of said check valve to open said check valve; and G. said compression spring being calibrated to a predetermined degree of compression to correspond to the air pressure to be maintained in the inflatable body and yieldable upon an increase in pressure to permit escape of pressure through the safety valve cap orifice means in the event of a pressure in the inflatable above the predetermined level.

2. The safety valve cap as defined in claim 1 wherein said disc member is seated in said interior chamber against an annular shoulder, formed therein.

3. The safety valve cap as defined in claim 1 wherein said orifice means in said outer end closure wall and disc member comprises a single orifice in each.

4. The safety valve cap as defined in claim 1 wherein said orifice means in said outer end closure wall and disc member comprises a plurality of orifices in each.

* * * * *